United States Patent [19]

Utz

[11] E Re. 29,262

[45] Reissued June 14, 1977

[54] ARRANGEMENT PERTAINING TO A CASE FOR BOTTLES, BOXES OR OTHER STANDARDIZED ARTICLES

[75] Inventor: Georg Utz, Bremgarten, Switzerland

[73] Assignee: Svein Stromberg & Co. A/S, Lillestrom, Norway

[22] Filed: Oct. 2, 1975

[21] Appl. No.: 618,948

Related U.S. Patent Documents

Reissue of:

[64] Patent No.: 3,762,594
Issued: Oct. 2, 1973
Appl. No.: 196,999
Filed: Nov. 9, 1971

[30] Foreign Application Priority Data

Nov. 9, 1970 Switzerland ..... 16612/70

[52] U.S. Cl. ..... 220/21; 220/DIG. 15; 211/126

[51] Int. Cl.[2] ..... B65D 1/24; A47F 3/14

[58] Field of Search ..... 220/21, DIG. 15, 83, 220/84; 206/139, 203; 211/126

[56] References Cited

UNITED STATES PATENTS

| | | | |
|---|---|---|---|
| 975,962 | 11/1910 | Kruse | 220/DIG. 2 |
| 2,303,240 | 11/1942 | Strong | 220/21 X |
| 3,628,684 | 12/1971 | Sere | 220/21 |

FOREIGN PATENTS OR APPLICATIONS

| | | | |
|---|---|---|---|
| 119,943 | 7/1970 | Norway | 220/21 |

*Primary Examiner*—William Price
*Assistant Examiner*—Steven M. Pollard
*Attorney, Agent, or Firm*—Watson, Cole, Grindle & Watson

[57] ABSTRACT

A case for the transportation and storage of bottles, boxes and like articles having an open side and top, a unit defining cells for the reception of the stored articles, the unit being located for sliding movement within the case between a lower and upper position so as to permit easy removal of the stored articles through the open side as the unit is moved vertically upwardly.

8 Claims, 2 Drawing Figures

FIG. 1.
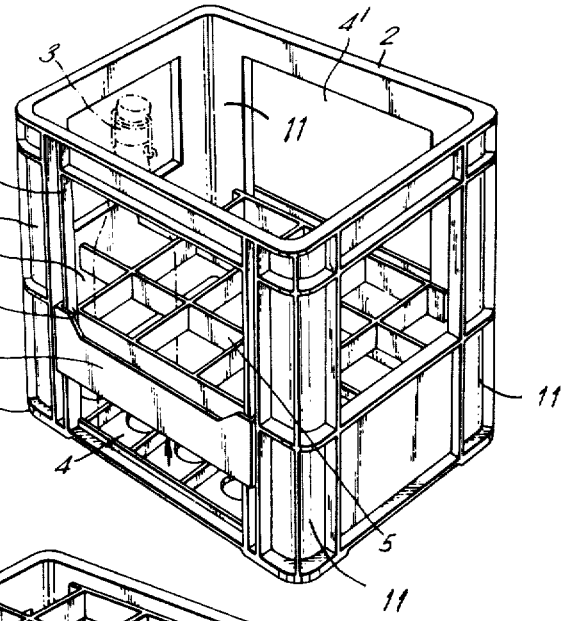
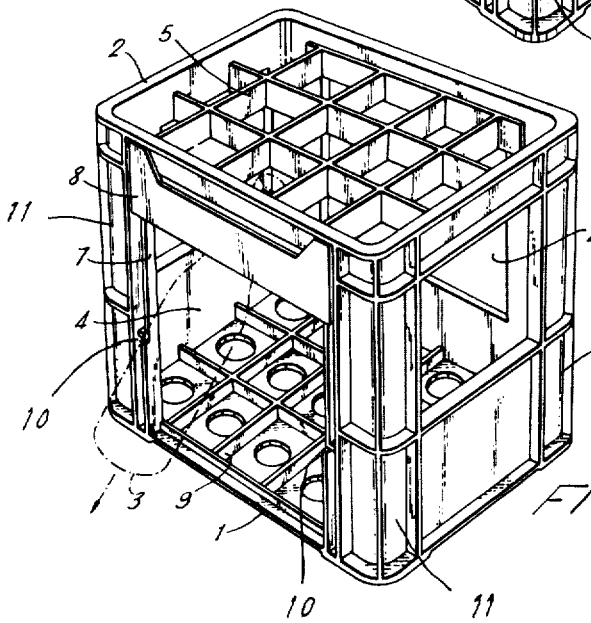
FIG. 2.

ARRANGEMENT PERTAINING TO A CASE FOR BOTTLES, BOXES OR OTHER STANDARDIZED ARTICLES

Matter enclosed in heavy brackets [ ] appears in the original patent but forms no part of this reissue specification; matter printed in italics indicates the additions made by reissue.

The present invention relates to a case for transport and storage of bottles, boxes or other standardized articles, which case is of the type wherein at least one side wall is provided with an opening so dimensioned that the goods in the case can be viewed but is prevented from falling out by means of a bar or the like running across said opening, and connected to the case by slide guides or the like so that the bar can be lifted from a locking position wherein it will arrest the goods, to an upper position near the upper case edge where said opening is free and goods can be removed through it.

Cases of the mentioned type are usually arranged for stacking. In a stacked position they can form a suitable storage and transport display unit permitting a good survey of the content of the various cases, and permitting goods to be removed from said cases when said bar has been raised into an upper position.

Cases of this type have found extensive use during the last years, since by simple means they can be made to serve both as transport cases and as display units, e.g. in self service shops.

It has, however, been noted that such cases have the disadvantage, especially when used for bottles, and especially large bottles, that said bottles tend to move into contact with one another during transport and handling. This not only results in clinking sounds but it also causes the bottles to break. Also, when the cases are used for cartons, deformations and leakages may occur.

The object of the present invention is to avoid this disadvantage, and such is achieved by providing the bar or locking means in front of the opening with elements which project into the case and form [distance] *divider* members between the bottles or the like standing in the case. Said bottles or the like are thus unable to directly contact one another when the bar is in a locking position, i.e. during any handling or transport.

Said [distance] *divider* members are preferably formed in the manner of a grating or a framework of partition walls or ledges crossing each other at right angles. Said framework is advantageously formed in one piece with the locking bar, or, in other words, said bar can form a part of said framework. When said bar or front portion of said frame is lifted, the entire framework will thus be lifted and the contents of said case can be freely removed. Bottles or the like are thus lifted somewhat, at their lower portion is swung forwardly, and they are drawn outwardly from the case.

Said framework or the like may be guided in a suitable manner during its upwardly and downwardly directed movement by slide fitting inside the case, and/or by being fastened to a locking bar of the type that is movable up and down in the side opening of the case by means of cooperating guides along the vertical lateral edges of the opening and on the bar ends.

The invention will be better understood from the following description of an embodiment shown in the drawing. It should, however, be noted that said embodiment is only intended as an illustration of the inventive idea which idea can be realized in a large number of modified embodiments without departing from the scope of the invention.

FIG. 1 shows a case according to the invention with the bar in a locking position and in such a manner that the [distance] *divider* members or partitions are in an effective position.

FIG. 2 shows the same case with the bar and the partitions in a raised position.

The case is provided with a bottom 1 and an upper edge 2 adapted to permit cases of this type to be stacked above one another in a known manner. *Spaced upstanding corner posts 11 are located on bottom wall 1.*

The case is provided with a side opening 4 extending over the main portion of one longitudinal wall of the case. Said opening 4 can be locked by a bar 8, provided with guides 6 at its ends for cooperation with the lateral edges 7 of the case opening 4. The details mentioned above are known per se.

According to the invention a system of [distance] *divider* members intended to rest between the bottles when the bar is in a locking position, as shown in FIG. 1, is secured to or formed in one piece with bar 8. In the embodiment shown in the drawing said [distance] *divider* members consist of a framework 5 of [flow] *shallow* partitions crossing each other at straight angles. A bottle standing in the case is indicated at 3.

FIG. 2 illustrates the manner in which bottle 3 is removed when bar 8 and framework 5 are in a raised position. It can be seen that the case bottom is provided with upright standing ribs 9 corresponding with framework 5 for further maintaining the bottles in place.

*Bar 8 and the connected framework 5 are maintained in the position of FIG. 1 at a spaced distance above bottom 1 by means of shoulders 10 on lateral edges 7 which serve to support the bar.*

The case shown in the drawing has its residual three sides provided with somewhat lower openings 4' permitting a survey of the content of the cases from all sides and also arranged to conserve both weight and material. Furthermore, the bottom is shown with circular openings (not referenced) beneath the bottom of each bottle which openings have a smaller diameter as compared to the bottoms of bottles 3. These openings are provided to facilitate removal of the bottles, as the neck of a bottle in a case can project somewhat into the corresponding openings of the upper case when said bottle is lifted for removal.

The inside of the case and/or the outer portions of the framework adjacent the interior of the case may be so formed as to guide the framework in a suitable manner during its movement up or down in the case. The interior of the case can also be formed with vertical ribs or the like serving as [distance] *divider* members between the bottles or the like located adjacent the walls. The framework or the like is then only formed of [distance] *divider* members for the remainder of the bottles.

The bar and/or the framework can be formed with bosses, recesses or the like for cooperation with corresponding parts formed on the case so as to form means by which the movable parts are maintained by a suitable frictional or locking force in their locking or raised position respectively.

The case in accordance with the invention is primarily designed for bottles or similar articles which could be damaged if they contact one another during transport and handling. The dimensions and height which the bars and [distance] *divider* members are lifted naturally must be adapted to the bottles or the like which are to be located in the case. Usually an opening for removal is only provided in one case side. However, if desired such openings can e.g. be arranged in two opposite sides.

I claim:

1. A case arrangement for the transport and storage of bottles, boxes and other like articles, having a bottom wall, an open top, spaced upstanding corner posts on said bottom wall, side walls extending between adjacent pairs of said posts along all but one side of said bottom wall, a unit located within the case for vertical sliding movement between said posts, said unit including intersecting connected bars forming cells for maintaining the articles stored in the case out of contact with one another, said unit further including a [narrow vertical] *horizontal* bar member secured to one end of said intersecting bars in spaced relationship therewith, said bar member lying outwardly of the remaining side of said bottom wall and slightly overlapping said adjacent pair of said posts at said remaining side thereby forming grooves therewith, inner portions of each of said posts at said remaining side lying within said respective grooves for guiding the vertical movement of said unit, shoulders formed on said portions near said bottom wall, the lower edge of said bar member resting on said shoulders thereby maintaining said intersecting bars spaced from said bottom wall.

2. The case arrangement according to claim 1 wherein said bars comprise narrow vertical walls intersecting at right angles.

3. The case arrangement according to claim 1 wherein further intersecting connected bars forming cells are provided on said bottom wall for further maintaining the articles stored in the case out of contact with one another, and an opening being provided in each of the cells of said further intersecting bars.

*4. A case arrangement for the transport and display of bottles, boxes and other like articles, comprising a bottom wall, upstanding side walls and an open top, an opening provided in at least one side wall along said bottom wall and dimensioned so as to permit said articles to be removed therethrough, a unit locked within the case and adapted for vertical sliding movement between said side walls, said unit including intersecting connected bars forming cells for maintaining the articles stored in the case out of contact with one another, said unit further including a narrow horizontal bar member provided at an end of said interconnecting bars adjacent said opening, said bar member extending across said opening and facilitating the vertical movement of said unit, means on said side walls cooperating with said unit for guiding the vertical lifting of said unit, shoulders formed adjacent said opening for supporting said bar member and for maintaining said intersecting bars spaced from said bottom wall.*

*5. The case arrangement of claim 4, comprising upstanding ribs provided on said bottom wall and aligned with the intersecting bars of said unit.*

*6. The case arrangement according to claim 4, wherein said guide means is provided along the lateral edges of said opening and said bar member slightly overlaps said lateral edges.*

*7. An open-top case for shipping and displaying articles such as bottles and adapted for stacking with like cases, comprising a bottom, upstanding side walls, an opening provided in at least one side wall along said bottom and dimensioned so as to permit said articles to be removed therethrough, a unit located within the case and adapted for vertical sliding movement from a lower shipping position to a raised display position, said unit including intersecting connected bars forming cells for maintaining the articles stored in the case out of contact with one another, said unit further including a narrow horizontal bar member provided at an end of said intersecting bars adjacent said opening, said bar member extending across said opening and slightly overlapping the lateral edges thereof for guiding the vertical movement of said unit, and means for maintaining said unit in said lower shipping position.*

*8. The open-top case according to claim 7, comprising upstanding ribs provided on said bottom wall and aligned with the intersecting bars of said unit.*

* * * * *